(12) United States Patent
Sutherland

(10) Patent No.: US 11,566,856 B2
(45) Date of Patent: Jan. 31, 2023

(54) HEAT TRANSFER FOR EXTRACT DISTILLATION

(71) Applicant: ExtractCraft, Longmont, CO (US)

(72) Inventor: Lee Sutherland, Longmont, CO (US)

(73) Assignee: EXTRACTCRAFT, LLC, Longmont, CO (US)

( * ) Notice: Subject to any disclaimer, the term of this patent is extended or adjusted under 35 U.S.C. 154(b) by 1078 days.

(21) Appl. No.: 15/783,957

(22) Filed: Oct. 13, 2017

(65) Prior Publication Data

US 2019/0113291 A1    Apr. 18, 2019

(51) Int. Cl.
| | |
|---|---|
| *B01D 3/02* | (2006.01) |
| *F28F 13/18* | (2006.01) |
| *B01D 1/22* | (2006.01) |
| *B01D 3/00* | (2006.01) |
| *B01D 3/10* | (2006.01) |
| *B01D 3/40* | (2006.01) |
| *B01D 11/02* | (2006.01) |

(52) U.S. Cl.
CPC ............ *F28F 13/187* (2013.01); *B01D 1/221* (2013.01); *B01D 3/009* (2013.01); *B01D 3/02* (2013.01); *B01D 3/10* (2013.01); *B01D 3/40* (2013.01); *B01D 11/0288* (2013.01); *F28F 2260/00* (2013.01)

(58) Field of Classification Search
None
See application file for complete search history.

(56) References Cited

U.S. PATENT DOCUMENTS

| | | | |
|---|---|---|---|
| 4,877,530 A * | 10/1989 | Moses ................ | B01D 11/0407 210/511 |
| 5,354,428 A | 10/1994 | Clark et al. | |
| 6,736,204 B2 * | 5/2004 | Gollan .................. | C25D 5/022 165/133 |
| 9,207,025 B2 * | 12/2015 | Varanasi ................. | B05D 7/22 |
| 2012/0118722 A1 | 5/2012 | Holtzapple et al. | |

FOREIGN PATENT DOCUMENTS

| | | | | |
|---|---|---|---|---|
| CN | 203944406 U | 11/2014 | | |
| CN | 104342734 A | 2/2015 | | |
| GB | 612592 A | 11/1948 | | |
| WO | WO-2011144639 A1 * | 11/2011 | ............. | A61P 29/00 |
| WO | WO-2015175147 A2 * | 11/2015 | ............ | F28F 13/187 |

OTHER PUBLICATIONS

Phan et al. International Journal of Heat and Mass Transfer. 52 (2009) 5459-5471. (Year: 2009).*

* cited by examiner

*Primary Examiner* — Terry A McKelvey
*Assistant Examiner* — Catheryne Chen
(74) *Attorney, Agent, or Firm* — Oliff PLC

(57) ABSTRACT

A method for improving heat transfer during distillation and concentration of extract with solvent includes providing a distillation vessel having a heat transfer surface and preparing the heat transfer surface with a plurality of surface features. A distillation and concentration system includes a distillation vessel having a heat transfer surface prepared with a plurality of surface features in accordance with the method.

7 Claims, 4 Drawing Sheets

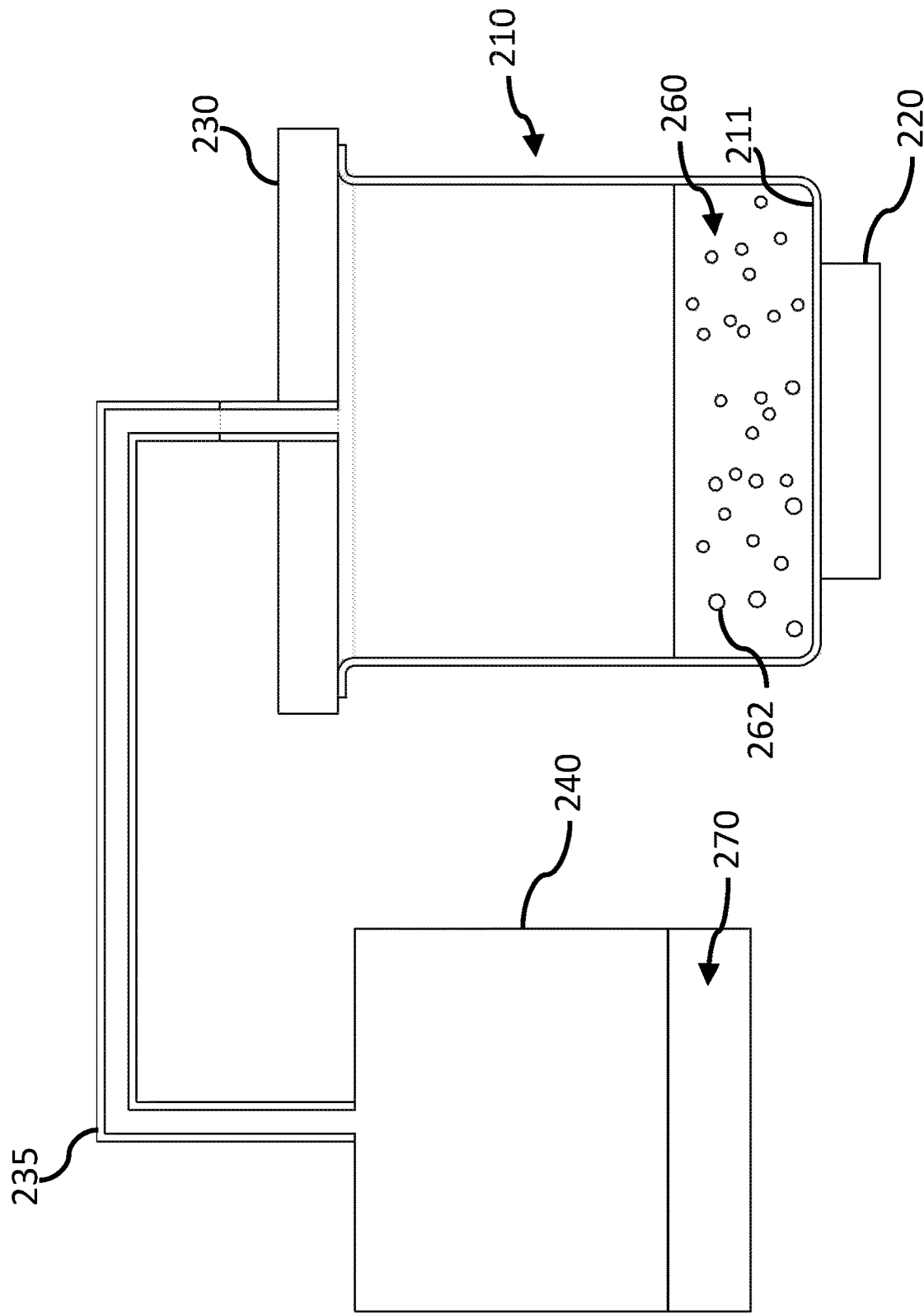

HEAT TRANSFER FOR EXTRACT DISTILLATION

SUMMARY

The disclosure seeks to describe a method for improving heat transfer during distillation and concentration of extract with solvent which method includes providing a distillation vessel having a heat transfer surface and preparing the heat transfer surface with a plurality of surface features.

The disclosure also seeks to describe a system for improving heat transfer during distillation and concentration of extract which system includes a distillation vessel having a heat transfer surface with a plurality of surface features.

The disclosure further seeks to describe a method for phytochemical extraction which method includes providing a distillation vessel having a heat transfer surface prepared with a plurality of surface features; providing a mixture of solvent and plant extract to the distillation vessel; placing the distillation vessel on a heat source; coupling the distillation vessel with a collector configured to collect condensed alcohol; and boiling the mixture such that nucleate boiling occurs at the plurality of surface features.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 4 illustrates an example distillation and extract concentration system in accordance with an embodiment of the disclosure.

DETAILED DESCRIPTION

The following detailed description illustrates embodiments of the present disclosure and manners by which they can be implemented. Although the best mode of carrying out disclosed systems and methods has been described, those skilled in the art would recognize that other embodiments for carrying out or practicing the these systems and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Solvent based extraction of plant compounds has likely been effected since before human history. In recent times, the extraction of plant materials using alcohols has become an economically significant industry around the world.

An important aspect of solvent based plant extraction processes is the use of alcohols to dissolve economically or pharmaceutically important phytochemicals from both the exterior and interior of the cells of the plant material, allow separation of the alcohol mixture with these chemicals from the remainder of the plant material, and subsequently remove and recover the solvent from the mixture to yield pure plant extracts for food, beverage, cosmetic, medicinal, and industrial requirements.

Figure 1:
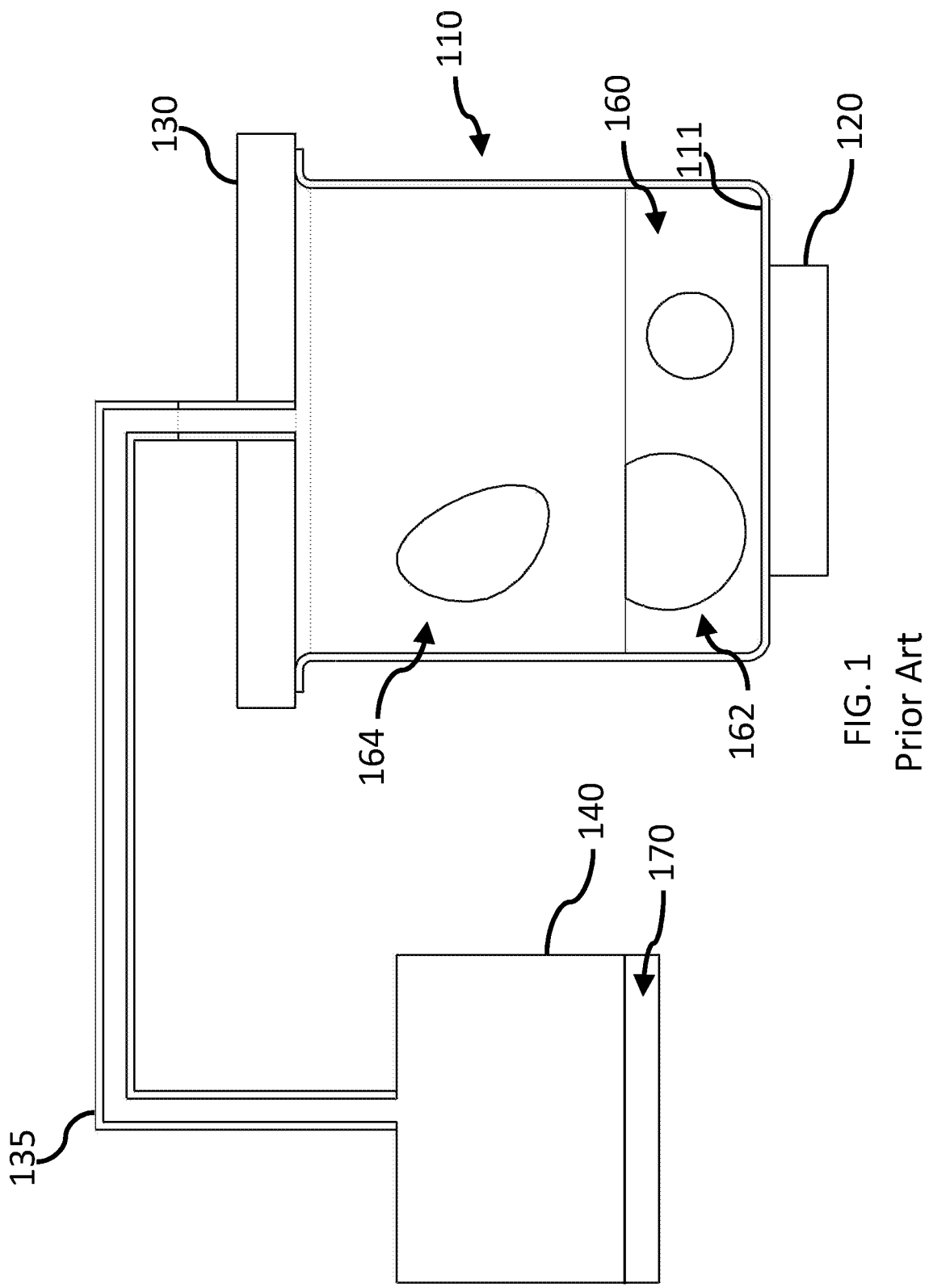
FIG. 1 illustrates an example prior art distillation and extract concentration system.

Referring to FIG. 1, typical extraction processes introduce a solvent and extract mixture 160 into a heated vacuum distillation vessel 110 and raise the mixture temperature to the boiling point of the solvent. The boiling temperature of the solvent is dependent on both the concentration of the solvent in the mixture and the pressure of the evaporation vessel. During the heat transfer process, a substrate 111 is heated by a heating element 120 such that the energy is transferred to the solvent and extract mixture 160. As the mixture in close proximity reaches the boiling point of the solvent, vapor bubbles form and congregate, eventually reaching a size that allows detachment from the substrate to rise through the mixture to be released into the distillation vessel. The vapor can be drawn off through seal 130 and tubing 135 and recovered as fluid 170 in a collector 140. Eventually, the solvent is evaporated from the mixture, leaving substantially pure plant extract in the distillation vessel 110.

The heat transfer element of this boiling process is important. As the heat flux into the mixture increases, a phase of boiling known as nucleate boiling occurs, where vapor bubbles are able to release in an orderly fashion and escape the heated substrate surface. The rate of vapor generation is maximized at a minimum temperature. In addition, spatial variations in temperature in the mixture are minimized due to smooth flow of replacement liquid mixture to the nucleation sites on the substrate. Nucleate boiling minimizes the superheated condition of the mixture, where the temperature of the vapor bubbles reaches significantly higher temperatures than the boiling temperature.

Superheating occurs when the heat flux into the mixture from the heated substrate 111 reaches a level where the vapor bubbles are not able to move as freely from the substrate before detachment, grow in size, and reduce the effective local heat transfer coefficient at the vapor formation site. Reducing the effective heat transfer coefficient causes the vapor to be in contact with an even warmer substrate zone, causing rapid growth in the bubble size. This condition is known as transition boiling, and the growth of the bubbles 162 can be so rapid as to displace viscous plant extract in the mixture with eruptive ejections 164 and distribute it inside the distillation vessel 111. Eruptive ejections 164 make final collection of the extract more difficult and can contaminate the effluent of solvent for recovery. In addition, the elevated temperature of the superheated vapor in contact with the extract in the mixture can be high enough to induce a thermochemical decomposition of economically important components of a plant extract. As mixture 160 is reduced to its pure plant extract components, eruptive behavior becomes more prevalent, nucleate boiling is more difficult to maintain and superheated temperatures become even more extreme.

Systems and methods in accordance with the disclosure maintain nucleate boiling characteristics for mixtures consisting substantially of plant extracts and ethanol, isopropanol, and/or other higher alcohols. Vapor bubbles are able to release in an orderly fashion and escape the heated substrate surface. The rate of vapor generation is maximized at a minimum temperature. Smooth flow of replacement liquid mixture to the nucleation sites on the substrate result in spatial variations in temperature in the mixture being minimized. Further, the final quality of the plant extracts, the solvent recovery processes, and the plant extract recovery effectiveness of the distillation vessel are all improved.

A disclosed method for the design of material interfaces improves the heat transfer properties necessary to stably and efficiently effect the evaporation of alcohol solvents common for food, pharmaceutical, and chemical extraction processes from a complex liquid state in a manner that facilitates segregation of solvent vapor for efficient recovery free of extract. A surface treatment for heat transfer surfaces reduces superheating of the distillation mixture prior to solvent vapor nucleation and release.

The systems and methods in accordance with the disclosure reduce or eliminate the eruptive boiling that can eject extract to foul solvent vapor recovery systems, reduce the temperature required to effect an evaporation rate of the solvent, and reduce the extract temperature to reduce thermal degradation of the extract.

Using a textured heat transfer surface in a boiling vessel made of glass, aluminum, aluminum oxide, stainless steel, or common ceramics, disclosed methods improve the heat transfer for the distillation and concentration of a plant extract using alcohols. The surface is prepared to exhibit a substantially textured structure to optimize nucleate boiling during distillation of alcohol solvent and plant extract mixtures.

The textured structure accommodates a wide range of alcohol concentrations for each above-mentioned substrate as solvent is removed from the extract and reclaimed.

Additional aspects, advantages, features and objects of the present disclosure will be made apparent from the drawings and the detailed description of the illustrative embodiments construed in conjunction with the appended claims that follow.

A method for improving heat transfer during distillation and concentration of extract with solvent includes providing a distillation vessel 210 (FIG. 4) having a heat transfer surface 211 and preparing heat transfer surface 211 with a plurality of surface features to provide a plurality of nucleation sites for nucleate boiling of mixtures of the extract and solvent. Preparing the heat transfer surface with a plurality of surface features provides a number of advantages including increasing the surface wettability by mixtures of the extract and solvent.

Figure 2:
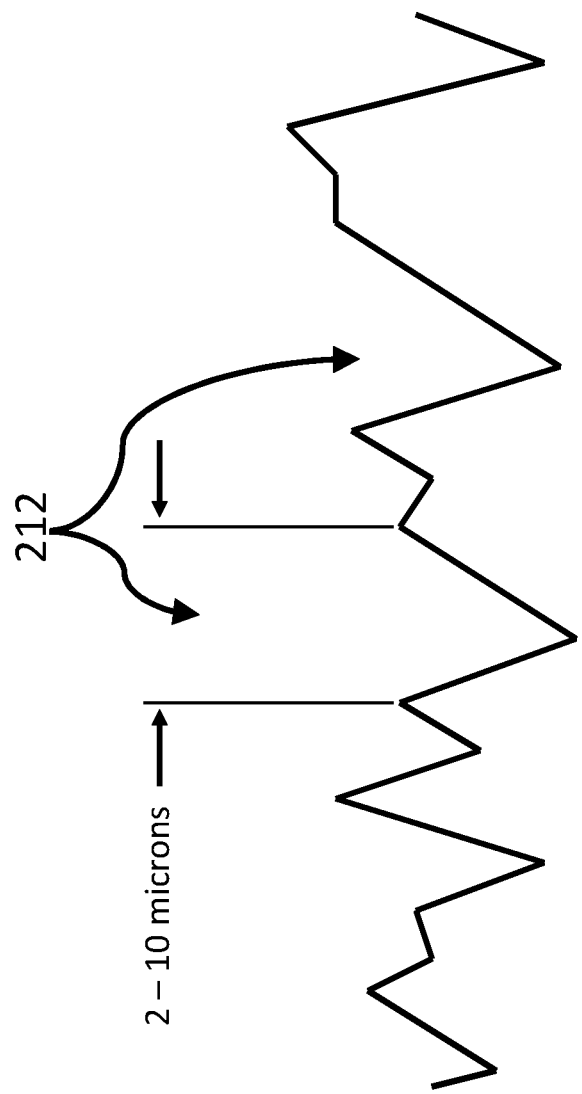
FIG. 2 illustrates a cross-section of an example heat transfer surface in accordance with embodiments of the disclosure.

The disclosed system exploits a textured surface to encourage nucleation of higher alcohol solvent (especially ethanol and isopropanol) vapor bubbles. The texture can be characterized by the ISO 4287/1:1984 standard between 2.0 and 10.0 microns (FIG. 2). Rougher surfaces than this are characterized as being difficult to clean and prone to fouling by the plant extract itself, and show little significant improvement to the production of stable nucleate boiling. Smaller textures offer little to no enhancement of nucleate boiling.

As solvating alcohol is removed from the distillation vessel, the mixture tends to become more viscous. Treatment of the heat transfer surface includes a distribution of feature sizes in the above disclosed range by which established nucleation sites are suitable for nucleate boiling over a range of fluid viscosities. The optimal feature sizes to promote nucleate boiling appear to favor larger features to avert eruptive transitional boiling, whereas the smaller feature sizes favor the less viscous alcohol rich mixture typical of an early stage of processing.

The treatment of heat transfer surface 211 can be effected in a number of ways. In one embodiment, the feature size of heat transfer surface 211 may be effected with a chemical etchant. In another embodiment, the feature size range may be achieved by treating a mold used for the production of heating substrates using a mechanical, electrical, or chemical etching process to achieve the feature size distribution in the finished product. In another embodiment, the feature size distribution may be effected through the use of an abrasive textile applied to produce gouges in the surface. In another embodiment, the desired substrate feature size range can be effected by rubbing an abrasive aggregate on the substrate.

Figure 3:
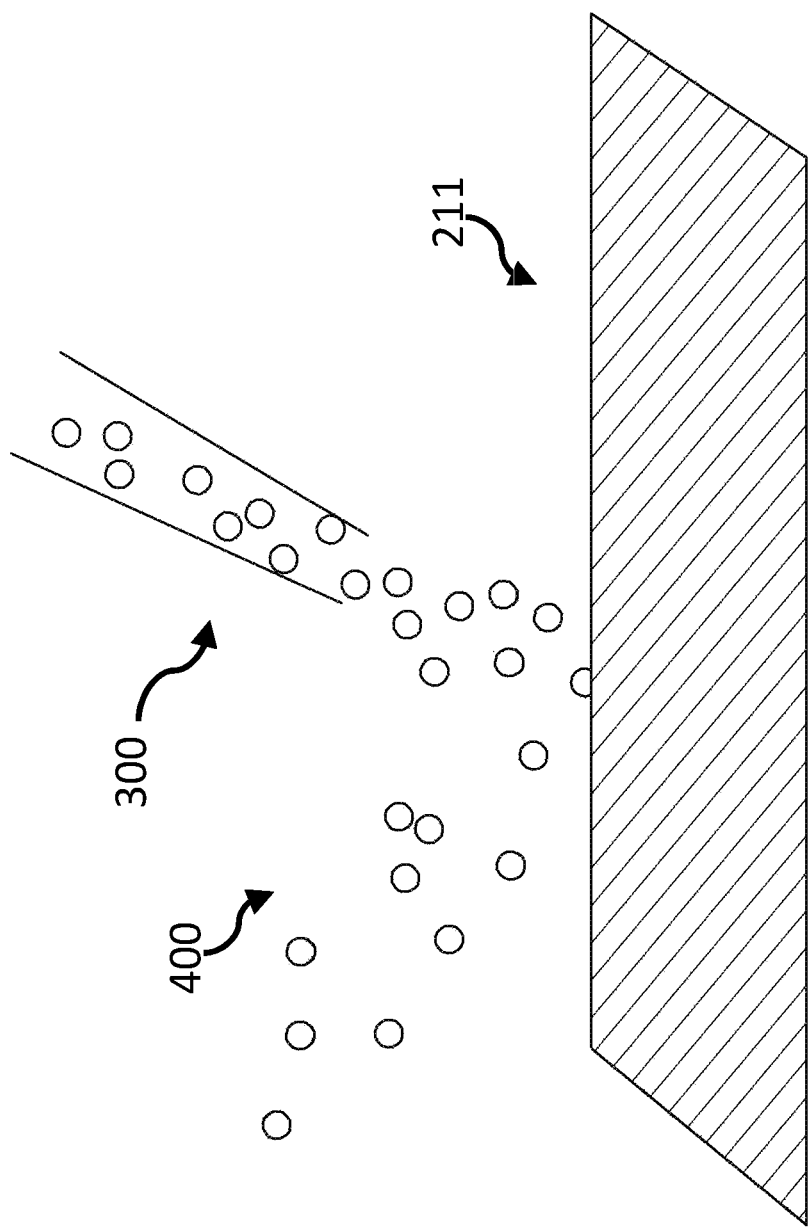
FIG. 3 illustrates a process for preparing the heat transfer surface with a plurality of surface features.

In another example, the surface features 212 are formed by blasting heat transfer surface 211 with media having a particle distribution between about 50 microns and about 200 microns so as to form surface features exhibiting a distribution of sizes between 2 microns and 10 microns and being suitable for nucleate boiling over a range of fluid viscosities. FIG. 3 illustrates a process for preparing the heat transfer surface with a plurality of surface features 212. A substantially angular blast medium 400 having a size distribution is delivered to heat transfer surface 211 with nozzle 300 to yield a substrate feature size ranging from about 2 microns to about 10 microns. Such a distribution of feature sizes has been experimentally yielded with a blast medium with a particle distribution between about 50 to about 200 microns, applied at from about 8 bar to about 15 bar absolute pressure and about 10 cm from an aluminum surface, for example. In an example, nozzle 300 is arranged to deliver blasting media 400 normal to the heat transfer surface. These parameters may be varied to achieve the same feature size range for different choices of substrate.

The heat transfer surface prepared to exhibit a substantially textured surface further is configured to reduce superheating mixtures of the extract and alcohols prior to solvent vapor nucleation; eliminate some or all eruptive boiling and reduce temperature required to affect an evaporation rate of the alcohols.

FIG. 4 illustrates an example distillation and extract concentration system in accordance with an embodiment of the disclosure and configured to improve heat transfer during distillation and concentration of extract. A distillation vessel 210 has a heat transfer surface 211 with a plurality of surface features 212 (FIG. 2) configured to control the wettability of the surface by mixtures of the extract and solvent. Surface features 212 further include nucleation sites suitable for mixtures of the extract and solvent.

According to a method for phytochemical extraction configured to improve heat transfer and reduce eruptive boiling, a distillation vessel 210 is provided with a heat transfer surface 211 prepared with a plurality of surface features 212. A mixture 260 of solvent and plant extract is supplied to distillation vessel 210 and distillation vessel 211 is placed onto a heat source 220. Distillation vessel 210 is coupled with a collector 240 configured to collect condensed solvent 270 passing through seal 230 and tubing 235.

After the extraction system has been arranged, mixture 260 is boiled such that nucleate boiling occurs at the plurality of nucleation sites provided by surface features 212. Vapor bubbles 262 detach from the substrate to rise through the mixture and be released into the distillation vessel above the surface of the mixture. During boiling of mixture 260 nucleate boiling initially occurs at smaller features and proceeds to larger features as viscosity of the mixture increases. Condensed solvent is recovered from collector 240 and plant extract is recovered from distillation vessel 210.

Heat transfer surface 211 may be formed of any of a variety of materials including but not limited to glass, aluminum, aluminum oxide, stainless steel, or common ceramics. Upon preparation of the heat transfer surface with the plurality of surface features the temperature of the extract is reduced during the distillation. When the heat transfer surface is prepared by blasting media the media may be blasted, for example, at between about 8 bar and about 15 bar absolute pressure. In an example, the media is blasted at the heat transfer surface at a distance of about 10 cm from the heat transfer surface. In an example, the media is blasted at the heat transfer surface substantially normal to the heat transfer surface.

In an example, solvent 270 includes a higher alcohol.

It will be appreciated that features of the present disclosure are suitable for arrangement in various combinations without departing from the scope of the present disclosure as defined by the appended claims.

Disclosed actions are only illustrative and other alternatives can also be provided where one or more actions are added, one or more actions are removed, or one or more actions are provided in a different sequence without departing from the scope of the claims herein.

Embodiments of the present disclosure are susceptible to being used for various purposes, including, though not limited to, enabling users to distill and extract economically or pharmaceutically important chemicals such that vapor bubbles are able to release in an orderly fashion and escape a heated substrate surface, the rate of vapor generation is maximized at a minimum temperature and spatial variations in temperature in the mixture is minimized. Further, a user is able to improve the final quality of the plant extracts, the solvent recovery processes, and the plant extract recovery effectiveness of the distillation vessel.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for improving heat transfer during distillation and concentration of extract, comprising:
a distillation vessel having a heat transfer surface with a plurality of surfaces with peaks whereby spacing between each of the peaks is between 2 microns and 10 microns and such spacing is formed by blasting media at the heat transfer surface.

2. The system as set forth in claim 1, wherein the surface features are configured to control the surface wettability by mixtures of extract and solvent.

3. The system as set forth in claim 1, wherein the surface features further comprise nucleation sites suitable for mixtures of extract and solvent.

4. The system as set forth in claim 1, wherein the surface features exhibit a distribution of sizes.

5. The system as set forth in claim 1, wherein the surface features comprise nucleation sites suitable for nucleate boiling over a range of fluid viscosities.

6. A system for improving heat transfer during distillation and concentration of extract, comprising:
a distillation vessel having a heat transfer surface with a plurality of surface features formed by blasting media having a particle distribution between about 50 microns and about 200 microns so as to form the surface features with peaks whereby spacing between each of the peaks is between 2 microns and 10 microns.

7. A system for improving heat transfer during distillation and concentration of extract, comprising:
a distillation vessel having a heat transfer surface with a plurality of surface features formed by blasting media having a particle distribution between about 50 microns and about 200 microns so as to form the surface features with peaks whereby spacing between each of the peaks is between 2 microns and 10 microns, further comprising nucleation sites suitable for mixtures of the extract and a higher alcohol solvent.

* * * * *